US 10,445,888 B2

United States Patent
Lee

(10) Patent No.: US 10,445,888 B2
(45) Date of Patent: Oct. 15, 2019

(54) METHOD OF PROVIDING POSITION-CORRECTED IMAGE TO HEAD-MOUNTED DISPLAY AND METHOD OF DISPLAYING POSITION-CORRECTED IMAGE TO HEAD-MOUNTED DISPLAY, AND HEAD-MOUNTED DISPLAY FOR DISPLAYING THE POSITION-CORRECTED IMAGE

(71) Applicant: Grew Creative Lab Inc., Wanju_Gun (KR)

(72) Inventor: Sang Ho Lee, Incheon (KR)

(73) Assignee: Grew Creative Lab Inc., Wanju_Gun (KR)

( * ) Notice: Subject to any disclaimer, the term of this patent is extended or adjusted under 35 U.S.C. 154(b) by 114 days.

(21) Appl. No.: 15/801,368

(22) Filed: Nov. 2, 2017

(65) Prior Publication Data
US 2019/0073778 A1 Mar. 7, 2019

(30) Foreign Application Priority Data
Sep. 4, 2017 (KR) .................. 10-2017-0112367

(51) Int. Cl.
*G06T 7/30* (2017.01)
*G06T 7/70* (2017.01)
(Continued)

(52) U.S. Cl.
CPC ............ *G06T 7/30* (2017.01); *G06F 3/012* (2013.01); *G06F 3/013* (2013.01);
(Continued)

(58) Field of Classification Search
CPC .... G06T 7/30; G06T 3/40; G06T 3/60; G06T 7/70; G06F 3/14; G06F 3/012
See application file for complete search history.

(56) References Cited

U.S. PATENT DOCUMENTS

2006/0202985 A1* 9/2006 Kobayashi ............ G06T 15/04
345/419
2006/0250322 A1* 11/2006 Hall .................. G02B 27/0172
345/8
(Continued)

FOREIGN PATENT DOCUMENTS

JP  2016-057947  4/2016
KR  10-1036600   5/2011
(Continued)

OTHER PUBLICATIONS

An Office Action issued by the Korean Intellectual Property Office dated Aug. 7, 2018, which corresponds to Korean Patent Application No. 10-2017-0112367 and is related to U.S. Appl. No. 15/801,368; with English translation.
(Continued)

*Primary Examiner* — Ming Y Hon
(74) *Attorney, Agent, or Firm* — Studebaker & Brackett PC

(57) ABSTRACT

A method for providing a position-corrected image to an HMD and a method for displaying the position-corrected image on the HMD, and a HMD that displays a position-corrected image using the same are provided. A method for providing a position-corrected image to a head-mounted display (HMD) according to an exemplary embodiment of the present invention includes: extracting an object distance to a target object from image information; acquiring rotation information according to head motion of a user of the HMD; calculating a position correction value of an image by using the object distance and the rotation information; and converting the image according to the position correction value and providing the position-corrected image to the HMD.

14 Claims, 11 Drawing Sheets

(51) Int. Cl.
*G06F 3/01* (2006.01)
*G06F 3/14* (2006.01)
*G06T 3/40* (2006.01)
*G06T 3/60* (2006.01)
*G09G 5/38* (2006.01)
*G06F 3/0481* (2013.01)

(52) U.S. Cl.
CPC ............ *G06F 3/04815* (2013.01); *G06F 3/14* (2013.01); *G06T 3/40* (2013.01); *G06T 3/60* (2013.01); *G06T 7/70* (2017.01); *G09G 5/38* (2013.01); *G09G 2340/0464* (2013.01); *G09G 2354/00* (2013.01); *G09G 2370/022* (2013.01); *G09G 2370/16* (2013.01)

(56) References Cited

U.S. PATENT DOCUMENTS

| | | | | |
|---|---|---|---|---|
| 2008/0130015 | A1* | 6/2008 | Lu | G01B 11/25 356/610 |
| 2010/0321409 | A1* | 12/2010 | Komori | G02B 27/017 345/656 |
| 2014/0055353 | A1* | 2/2014 | Takahama | G06F 3/012 345/156 |
| 2014/0232637 | A1* | 8/2014 | Park | G02B 27/017 345/156 |
| 2015/0055821 | A1* | 2/2015 | Fotland | G06K 9/3241 382/103 |
| 2015/0268473 | A1* | 9/2015 | Yajima | G02B 27/0172 345/633 |
| 2016/0035140 | A1* | 2/2016 | Bickerstaff | A63F 13/26 345/633 |
| 2016/0109712 | A1* | 4/2016 | Harrison | G02B 3/08 345/8 |
| 2016/0171675 | A1* | 6/2016 | Tseng | G06T 7/85 345/8 |
| 2016/0225192 | A1* | 8/2016 | Jones | G06F 3/012 |
| 2016/0282619 | A1* | 9/2016 | Oto | G02B 27/017 |
| 2017/0366797 | A1* | 12/2017 | Kim | H01N 13/344 |
| 2018/0005431 | A1* | 1/2018 | Yoshioka | G06T 15/205 |
| 2018/0196507 | A1* | 7/2018 | Kim | H04N 13/106 |
| 2018/0329482 | A1* | 11/2018 | Woo | G06T 15/005 |

FOREIGN PATENT DOCUMENTS

| | | |
|---|---|---|
| KR | 10-2012-0051308 | 5/2012 |
| KR | 10-2013-0078990 | 7/2013 |
| KR | 10-1345971 | 1/2014 |
| KR | 10-2016-0022921 | 3/2016 |
| KR | 10-2016-0022921 A | 3/2016 |
| KR | 10-2016-0147636 | 12/2016 |
| KR | 10-2017-0015375 | 2/2017 |
| KR | 10-2017-0079845 | 7/2017 |

OTHER PUBLICATIONS

WIPO, International Search Report of PCT/KR2017/011845 dated May 24, 2018.
WIPO, Written Opinion of the International Searching Authority of PCT/KR2017/011845 dated May 24, 2018.

* cited by examiner

METHOD OF PROVIDING POSITION-CORRECTED IMAGE TO HEAD-MOUNTED DISPLAY AND METHOD OF DISPLAYING POSITION-CORRECTED IMAGE TO HEAD-MOUNTED DISPLAY, AND HEAD-MOUNTED DISPLAY FOR DISPLAYING THE POSITION-CORRECTED IMAGE

CROSS-REFERENCE TO RELATED APPLICATION

This application claims priority to and the benefit of Korean Patent Application No. 10-2017-0112367 filed in the Korean Intellectual Property Office on 4 Sep. 2017, the entire contents of which are incorporated herein by reference.

BACKGROUND OF THE INVENTION

(a) Field of the Invention

The present invention relates to a method for providing a position-corrected image to a head-mounted display (HMD), a method for displaying a position-corrected image to the HMD, and an HMD that displays a position-corrected image using the same.

(b) Description of the Related Art

Virtual reality (VR) is an artificially generated virtual space that provides reality through a three-dimensional visual effect and the like.

Technology for realization of the virtual reality, enables a user to perceive reality by processing an input of the user in real time.

Such a virtual reality may be experienced by using a device such as a head-mounted display (HMD) and the like.

When the user wears the HMD on his head, an object can be seen as a three-dimensional stereoscopic object through a lens in the screen in front of the eyes of the user.

A three-dimensional stereoscopic effect perceived by a person can be achieved by the combination of factors such as a thickness variation of lenses depending on a position of the object, an angle difference between the left eye and the right eye on the object, a difference in position and shape of the object seen by both eyes, a disparity caused by motion of the object, a psychological factor of a viewer, and the like.

In particular, human eyes can carry out focus adjustment (Accomodation) and vergence adjustment which combines gazing points of each eye on the focusing object. In general, the HMD adopts a fixed screen method, and thus can not precisely reflect distance variation between the eyes of the user wearing the HMD and an object for proper accommodation and convergence.

That is, when the user views an image through the HMD, the eyes are focused to the screen but convergence of the left and right eyes is set to an object in the screen, thereby causing mismatch so that the user may feel fatigue and dizziness.

The above information disclosed in this Background section is only for enhancement of understanding of the background of the invention and therefore it may contain information that does not form the prior art that is already known in this country to a person of ordinary skill in the art.

PRIOR ART

Patent References (Patent reference 1) Korean Publication No. 2012-0051308 (published 2012 May 22.)
(Patent reference 2) Korean Publication No. 2013-0078990 (Published 2013 Jul. 10.)

SUMMARY OF THE INVENTION

The present invention has been made in an effort to provide a method for providing a position-corrected image by adjusting convergence by using image information and rotation information of a user's head and providing a position-corrected image that can be displayed through an HMD, a method for displaying a position-corrected image on the HMD, and an HMD that displays a position-corrected image using the same.

In the following detailed description, only certain exemplary embodiments of the present invention have been shown and described, simply by way of illustration. As those skilled in the art would realize, the described embodiments may be modified in various different ways, all without departing from the spirit or scope of the present invention.

A method for providing a position-corrected image to a head-mounted display (HMD) according to an exemplary embodiment of the present invention includes: extracting an object distance to a target object from image information; acquiring rotation information according to head motion of a user of the HMD; calculating a position correction value of an image by using the object distance and the rotation information; and converting the image according to the position correction value and providing the position-corrected image to the HMD.

The acquiring the rotation information may include acquiring a roll value, which is rotation information with respect to a depth direction of a screen of the HMD with reference to the user.

The calculating the position correction value of the image may include calculating a screen disparity value formed by the screen of the HMD and the HMD user based on the object distance and calculating the position correction value based on the screen disparity value and the roll value.

In the calculating the position correction value of the image, a movement matrix used to move the image by using the screen disparity value may be generated, a roll rotation matrix used to rotate the image by using the roll value may be generated, and a conversion matrix used to convert the image by using the movement matrix and the roll rotation matrix may be generated.

The acquiring the rotation information may include acquiring a roll value which is rotation information with respect to a depth direction of the screen of the HMD with reference to the ground, a pitch value which is rotation information with respect to a horizontal direction of the screen of the HMD with reference to the ground, and a yaw value which is rotation information with respect to a vertical direction of the screen of the HMD.

The calculating the position correction value of the image may include calculating a screen disparity value formed by the screen of the HMD and the HMD user based on the object distance and calculating the position correction value based on the screen disparity value, the roll value, the pitch value, and the yaw value.

In the calculating the position correction value of the image, a movement matrix used to move the image by using the screen disparity value may be generated, a rotation matrix used to rotate the image by using the roll value, the pitch value, and the yaw value may be generated, and a conversion matrix used to convert the image by using the movement matrix and the rotation matrix may be generated.

According to another exemplary embodiment of the present invention, a method for displaying a position-corrected image on a head-mounted display (HMD) is provided. The method for displaying the position-corrected image on the HMD includes: acquiring rotation information according to head motion of a user of the HMD; calculating a position correction value of an image by using the object distance and the rotation information; generating a position-corrected image by converting the image according to the position correction value; scaling the position-corrected image; and displaying the scaled position-corrected image on a screen of the HMD.

The scaling the position-corrected image may include scaling the position-corrected image based on a viewing angle and a screen resolution of the HMD.

The displaying the position-corrected image on the screen of the HMD may include processing to blur a focus with respect to an area outside the HMD by a predetermined distance.

A head-mounted display (HMD) that displays a position-corrected image according to an exemplary embodiment of the present invention includes: a display unit; a display unit; an image position corrector that converts an input image in real-time based on the rotation information and provides the converted input image; and a controller that displays a position-corrected image provided from the image position corrector on the display unit, wherein the image position corrector extracts an object distance to a target object from image information of the input image, calculates a position correction value of the image based on the object distance and the rotation information, and calculates the image based on the position correction value and provides the position-corrected image.

The HMD may further include: a storage unit that stores an image; and a communication unit that communicates with an external device and receives an image from the external device.

The sensor may acquire a roll value which is rotation information with respect to a depth direction of the screen of the HMD with reference to the ground, a pitch value which is rotation information with respect to a horizontal direction of the screen of the HMD with reference to the ground, and a yaw value which is rotation information with respect to a vertical direction of the screen of the HMD.

The image position corrector may calculate a screen disparity value formed by the screen of the HMD and the HMD user based on the object distance and may calculate the position correction value based on the screen disparity value and at least one including the roll value among the roll value, the pitch value, and the yaw value.

The image position corrector may generate a movement matrix used to move the image based on the screen disparity value, a rotation matrix used to rotate the image based on least one value including the roll value among the roll value, the pitch value, and the yaw value, and a conversion matrix used to convert the image based on the movement matrix and the rotation matrix.

The controller may scale the position-corrected image and may display the scaled image on the display unit.

The controller may scale the position-corrected image based on a viewing angle of the HMD and a screen resolution of the display unit.

The concrete subjects of the secondary exemplary embodiments are included in the detailed description and drawings.

According to the present invention, convergence can be adjusted by using image information and rotation information according to user's head motion so that a position-corrected image can be provided to the HMD and displayed on the HMD without changing physical configuration of a conventional HMD.

In addition, since the position-corrected image is provided to the HMD and displayed on the HMD, a fatigue of the user's eyes and dizziness can be reduced.

DETAILED DESCRIPTION OF THE EMBODIMENTS

Figure 1:
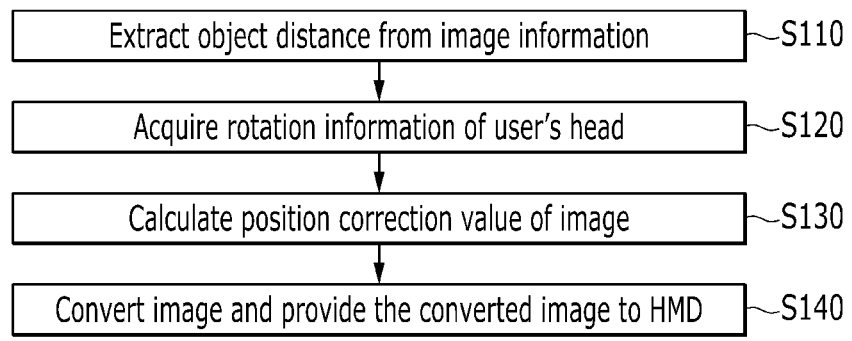
FIG. 1 is a flowchart of a method for providing an image of which a position is corrected to a head-mounted display according to an exemplary embodiment of the present invention.

Hereinafter, referring to the drawings, a preferred exemplary embodiment of the present invention will be described with reference to the accompanying drawings.

The advantages and features of the present invention and a method of achieving them will be made clear by referring to the exemplary embodiments described below in detail with reference to the accompanying drawings.

However, the present invention is not limited to the exemplary embodiments described below and may be implemented in various ways, the exemplary embodiments are provided to complete the present invention and make the scope of the present invention clear to those skilled in the art, and the present invention is defined only by the range described in claims.

Like reference numerals indicate like constituent elements throughout the specification.

Terms such as "first", "second", and the like are used to explain a variety of different elements, different constituents, and/or different sections. However, it will be understood that the present invention is not limited to this.

That is, the terms are used only to discriminate different elements, different components, or different sections.

Therefore, in the following description, a first element, a first constituent, or a first section may be referred to as a second element, a second constituent, or a second section.

In the following description, the technical terms are used only to explain a specific exemplary embodiment while not limiting the present invention.

The terms of a singular form may include plural forms unless referred to the contrary.

The meaning of "include" specifies a property, a region, a fixed number, a step, a process, an element, and/or a component, but does not exclude other properties, regions, fixed numbers, steps, processes, elements, and/or components.

Although not specifically defined, all of the terms including the technical and scientific terms used herein have meanings understood by ordinary persons skilled in the art.

The terms have specific meanings coinciding with related technical references and the present specification as well as lexical meanings. That is, the terms are not construed as having ideal or formal meanings.

Hereinafter, the present invention will be described in further detail with reference to the accompanying drawings.

FIG. 1 is a flowchart of a method for providing a position-corrected image to a head-mounted display (HMD) according to an exemplary embodiment of the present invention.

Figure 2:
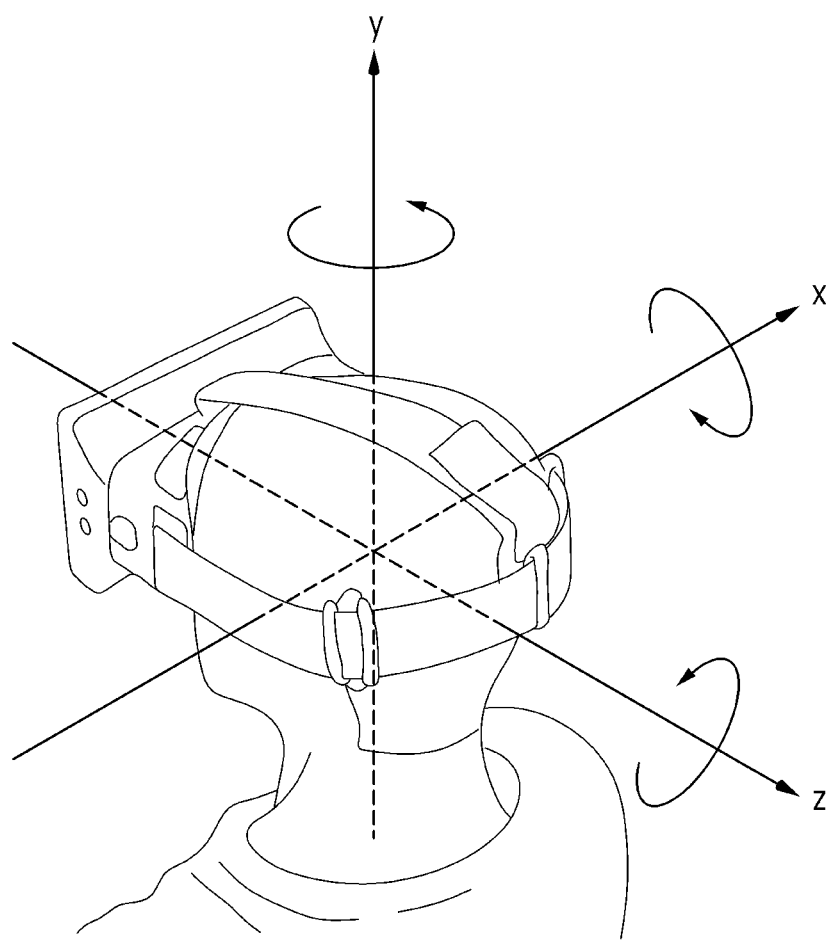
FIG. 2 is provided for description of a rotation direction of the head-mounted display according to head movement of a user of the HMD.

FIG. 2 is provided for description of a rotation direction of the HMD according to head movement of a user of the HMD.

Figure 3:
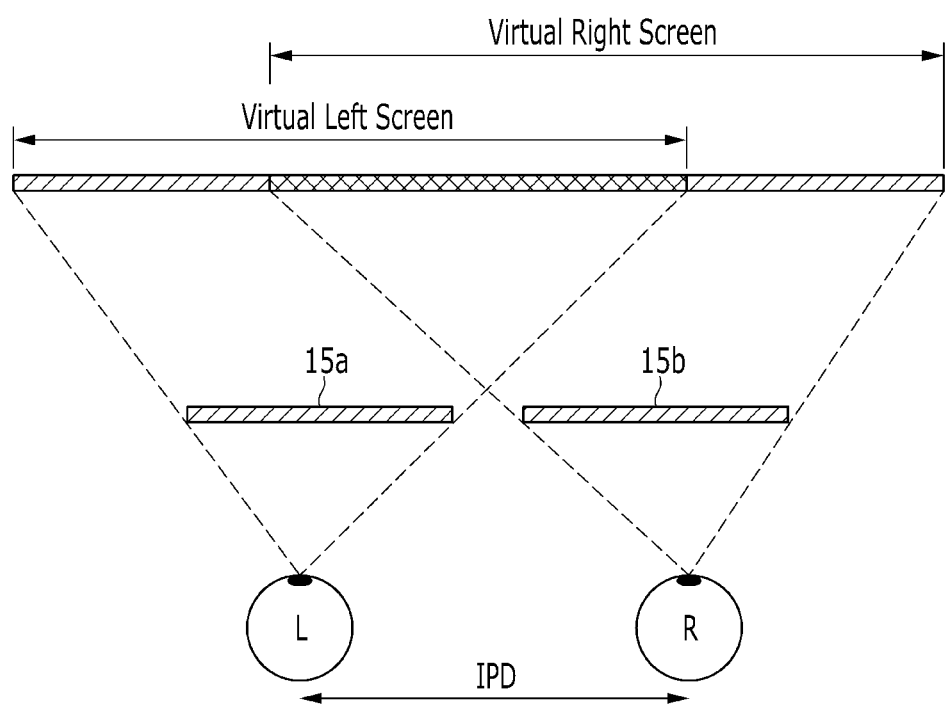
FIG. 3 is provided for description of an overview of video technology of the head-mounted display.

FIG. 3 is provided for description of an overview of video technology of the HMD.

Figure 4A:
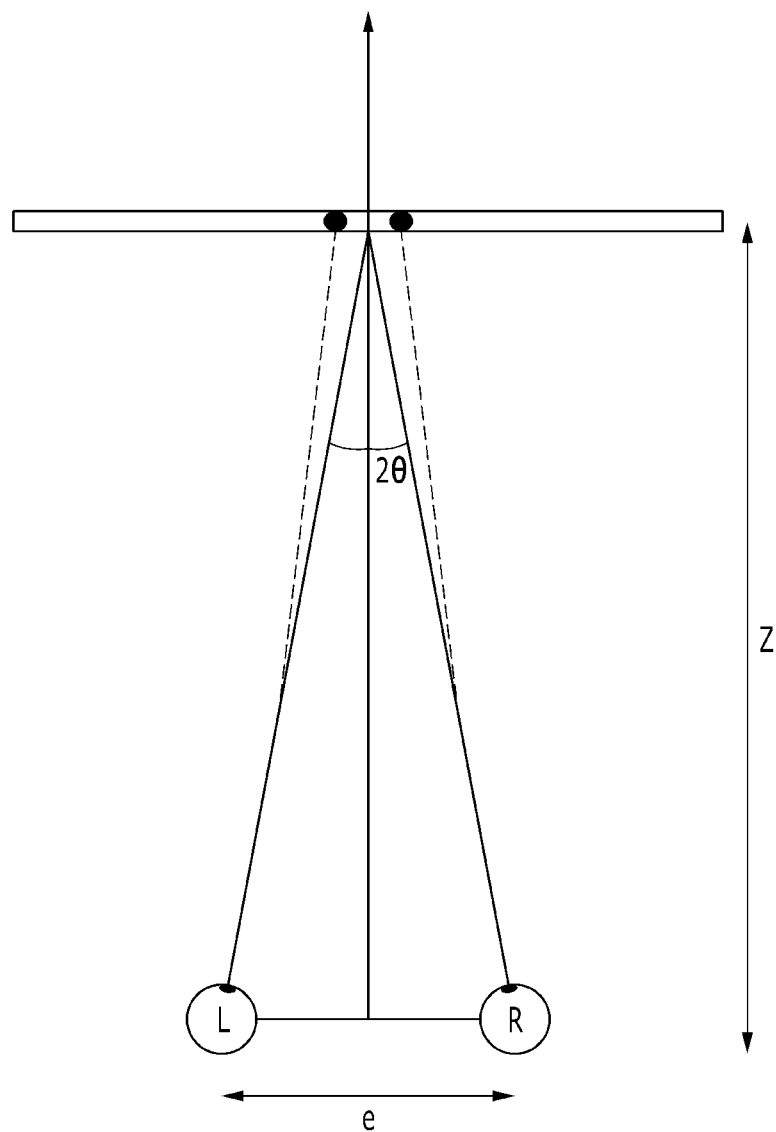
FIG. 4A to FIG. 4C show an exemplary embodiment of convergence adjustment.
Figure 4B:
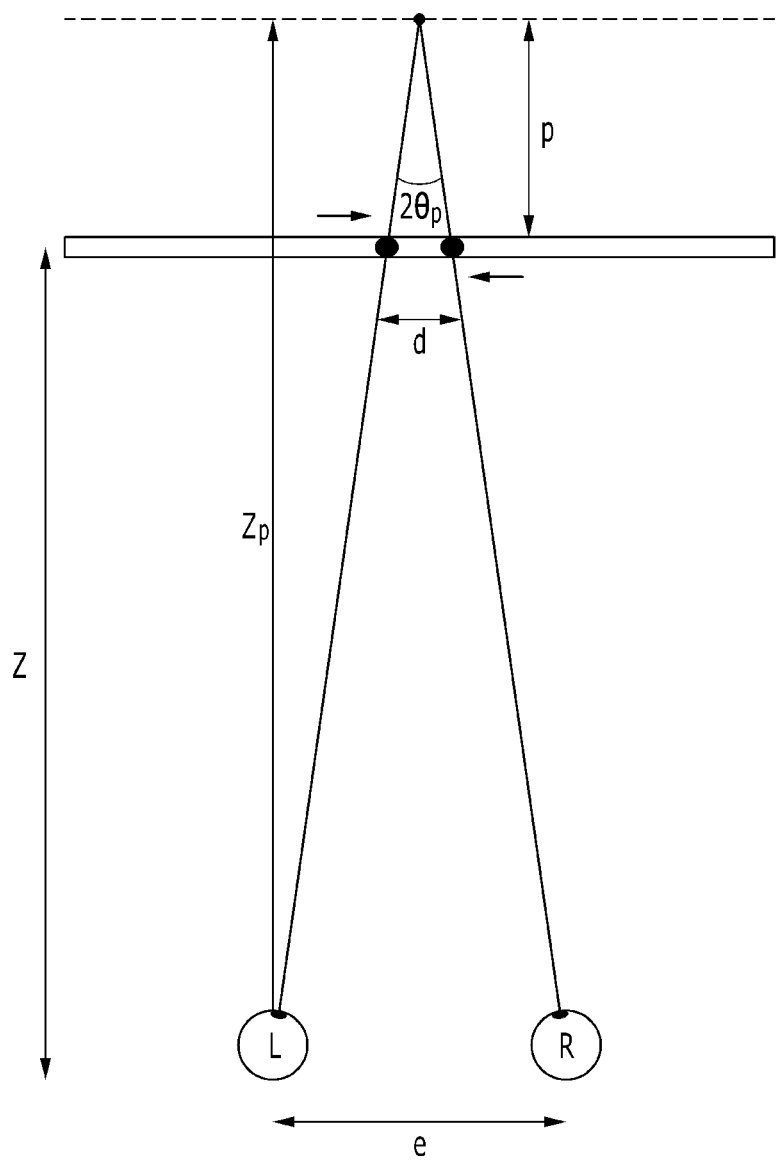
Figure 4C:
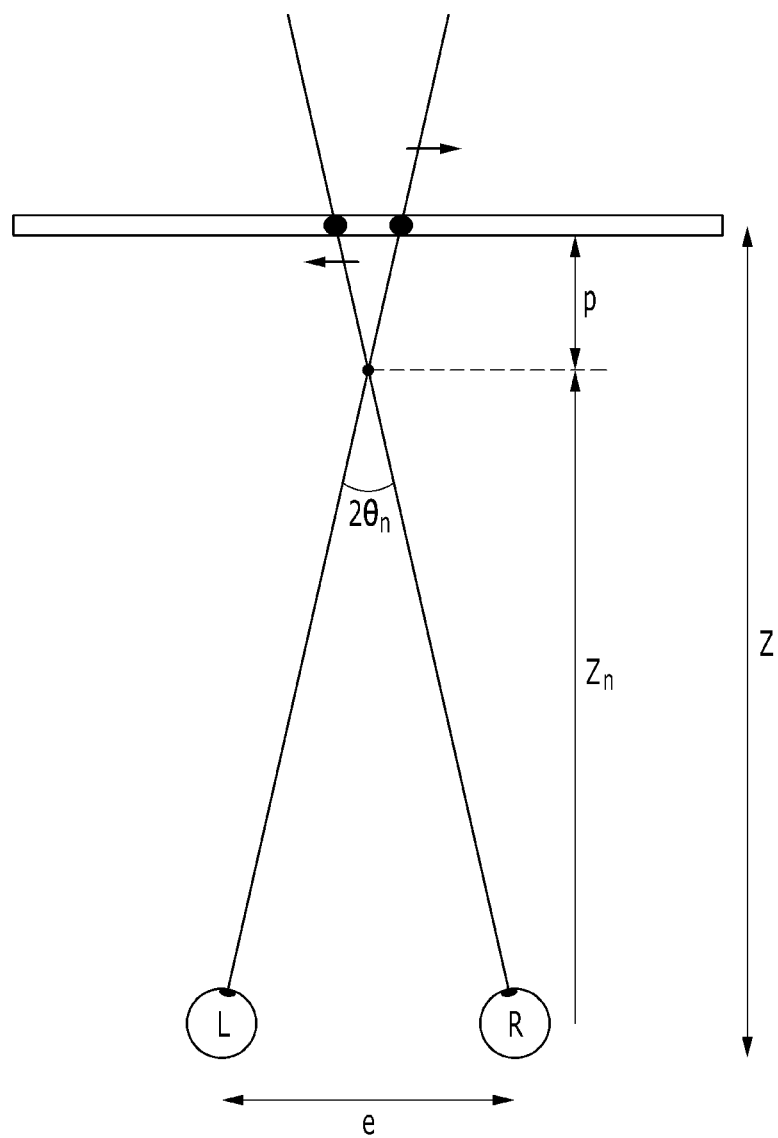

FIG. 4A to FIG. 4C are provided for description of an exemplary embodiment for convergence adjustment.

Referring to FIG. 1, a method for providing a position-corrected image to the HMD according to the exemplary embodiment of the present invention includes extracting an object distance to a target object from image information (S110), acquiring rotation information according to movement of a user's head (S120), calculating a position correction value of an image by using the rotation information (S130), and converting the image based on the position correction value and providing the converted image to the HMD (S140).

Here, when the object distance is extracted (S110), it can be extracted from image information of an image stored in the HMD or an image externally transmitted from the HMD.

The image information includes information of an object together with a file name, file capacity, playing time, a number of frames, resolution, and the like.

Specifically, an object name, an object direction, a movement distance of the object, a distance to the object, an object ratio, an object latitude, an object longitude, and the like may be included.

Thus, a distance to the object can be extracted from the object information included in the image information, and an object distance to a target object can be extracted from the image information.

When the rotation information is acquired (S120), at least one of a roll value, which is rotation information with respect to a depth direction of a screen of the HMD, a pitch value, which is rotation information with respect to a horizontal direction of the screen of the HMD, and a yaw value, which is rotation value with respect to a vertical direction of the screen of the HMD with reference to the user of the HMD can be acquired.

As shown in FIG. 2, the depth direction of the screen of the HMD may be referred as the z-axis, the horizontal direction of the screen of the HMD may be referred to as the x-axis, and the vertical direction of the screen of the HMD may be referred to as the y-axis, and in this case, rotation with reference to the z-axis becomes roll, rotation with reference to the x-direction becomes pitch, and rotation with reference to the y-axis becomes yaw.

Theoretically, at least one value including the roll value among the roll value, the pitch value, and the yaw value can be acquired.

That is, in order to calculate a position correction value of the image, the roll value, which is rotation information with respect to the depth direction of the screen of the HMD, is mainly used, and the pitch value and the yaw value may be used subsidiarily.

While accommodation of the eyes of the HMD user is set to the screen, convergence of the left and right eyes is set on the target object causing mismatching, thus convergence needs to be adjusted.

Accordingly, a depth of an image displayed on the HMD plays an important role.

Therefore, with reference to the user of the HMD, the roll value, which is rotation information with respect to the depth direction of the screen of the HMD, becomes an important factor in adjustment of convergence.

For reference, the rotation information can be acquired by using a sensor provided in the HMD.

In general, the HMD may be provided with a three-axis acceleration sensor that can sense acceleration in three directions, a three-axis gyro sensor that can sense angular velocity in three directions, and a three-axis terrestrial magnetism sensor that can sense terrestrial magnetism in three directions.

The angular speed measured by the gyro sensor implies an angle variation amount per unit time, and since integration of angular velocity gives an angle, the gyro sensor calculates rotation of the head of the HMD user by integrating angular velocity data.

In addition, an angular rate may be measured by using the gyro sensor and/or the terrestrial magnetism sensor.

Further, when the terrestrial magnetism sensor is not provided, the roll value and the pitch value can be calculated by using the acceleration speed measured by the acceleration sensor, and the yaw value can be calculated from the calculated roll and pitch values.

Here, when the position correction value of the image is calculated (S130), a screen disparity value is calculated by the screen of the HMD and the HMD user based on the object distance, and the position correction value is calculated based on at least one including the roll value among the roll value, the pitch value, and the yaw value, as well as the screen disparity value.

As shown in FIG. 3, the user may perceive a virtual three-dimensional effect through a pair of screens 15a and 15b that respectively correspond to the left eye L and the right eye R by using disparity of the left eye L and the right eye R of the user.

A virtual screen is shown in front of the eyes of the user, and then the eyes of the user set accommodation and adjust convergence such that a virtual three-dimensional stereoscopic image can be realized.

In this case, an inter-pupillary distance (IPD) between the left eye L and the right sys R of the user is about 60 mm to 70 mm.

A screen disparity value generated due to the IPD between the left eye L and the right eye R of the user can be calculated.

The screen disparity becomes a horizontal distance between left and right corresponding points of the screens 15a and 15b.

In FIG. 4A to FIG. 4C, the IPD between the left eye L and the right eye R of the user may be represented as e, and Z implies a distance from the eyes of the user to a fixed screen.

In this case, p implies parallax and d implies screen disparity.

In FIG. 4A, the eyes of the user are in the zero parallax state, and accordingly accommodation and convergence are matched.

FIG. 4B shows a positive parallax state in which the target object is positioned behind a convergence point so that the target object is seen to be sunken into the screen surface, and FIG. 4C shows a negative parallax state in which the target object is positioned ahead the convergence point so that the target object is seen to be protruded from the screen surface, thereby requiring convergence adjustment.

The image can be moved by using the screen disparity value, and the screen disparity value may have a positive (+) value when a depth value of the target object is greater than a fixed screen distance and the screen disparity value may have a negative (−) value when the depth value of the target object is smaller than the fixed screen distance.

The HMD has the pair of screens 15a and 15b that respectively correspond to the left eye L and the right eye R of the user, and therefore a movement value h of the image according to a screen disparity value d can be represented as given in Equation 1.

$$h \begin{array}{l} = d > 0 \\ = 0 \\ = d < 0 \end{array} \begin{array}{l} \text{, positive disparity } (Z_p > Z) \\ \text{, zero disparity } (Z_p = 0) \\ \text{, negative disparity } (Z_p < Z) \end{array} \quad \text{(Equation 1)}$$

Referring to FIG. 4B, the positive parallax state can be represented as given in Equation 2 and Equation 3.

$$p = (Z_p - Z) \quad \text{(Equation 2)}$$

$$\tan(\theta_p) = \frac{0.5d}{p} = \frac{0.5e}{Z_p} \quad \text{(Equation 3)}$$

Equation 4 can be derived from Equation 2 and Equation 3.

$$d = \frac{ep}{Z_p} = e\left(1 - \frac{Z}{Z_p}\right) \quad \text{(Equation 4)}$$

Referring to FIG. 4C, the negative parallax state can be represented as given in Equation 5 and Equation 6.

$$|p| = |Z_n - Z| \quad \text{(Equation 5)}$$

$$\tan(\theta_n) = \frac{0.5d}{|p|} = \frac{0.5e}{Z_n} \quad \text{(Equation 6)}$$

Equation 7 can be derived from Equation 5 and Equation 6.

$$d = \frac{ep}{Z_n} = e\left|\left(1 - \frac{Z}{Z_n}\right)\right| \quad \text{(Equation 7)}$$

Accordingly, Equation 1 becomes Equation 8 from Equation 4 and Equation 7.

$$h \begin{array}{l} = e\left(1 - \frac{Z}{Z_p}\right) \\ = 0 \\ = -e\left|\left(1 - \frac{Z}{Z_n}\right)\right| \end{array} \begin{array}{l} \text{, Positive parallex } (Z_p > Z) \\ \text{, Zero-disparity coneition } (Z_p = Z) \\ \text{, Negative parallex } (Z_p < Z) \end{array} \quad \text{(Equation 8)}$$

Next, the image can be diagonally moved by applying the rotation information to the value h.

The yaw value, the pitch value, and the roll value may be applied to the value h.

In particular, h becomes a value for horizontal movement of the image with respect to the HMD screen.

Referring to FIG. 2, h becomes a value for movement of the image on the x-axis, and rotation information that greatly affects the value h according to rotation of the user's head becomes a roll value.

Therefore, in the present exemplary embodiment, the roll value among the yaw value, the pitch value, and the roll value is applied to the value h to calculate the position correction value, and then the yaw value and/or the pitch value is applied to the calculated position correction value to thereby calculate a more precise position correction value.

However, the position correction value is calculated based on at least one value including the roll value among the roll value, the pitch value, and the yaw value, as well as the screen disparity value.

There are four vector components since the movement value of the image is applied to the roll value, the pitch value, and the yaw value, and thus h in Equation 8 can be represented as a movement matrix in Equation 9.

$$T(h) = \begin{bmatrix} 1 & 0 & 0 & h \\ 0 & 1 & 0 & 0 \\ 0 & 0 & 1 & 0 \\ 0 & 0 & 0 & 1 \end{bmatrix} \quad \text{(Equation 9)}$$

In addition, when the pitch value, the yaw value, and the roll value are respectively denoted as α, β, and, γ, referring to FIG. 2, α, β, and γ denote rotation information with respect to the x-axis, the y-axis, and the z-axis and therefore they can be respectively represented as rotation matrixes of Equation 10 to FIG. 12.

$$Rx(\alpha) = \begin{bmatrix} 1 & 0 & 0 & 0 \\ 0 & \cos\alpha & \sin\alpha & 0 \\ 0 & -\sin\alpha & \cos\alpha & 0 \\ 0 & 0 & 0 & 1 \end{bmatrix} \quad \text{(Equation 10)}$$

$$Ry(\beta) = \begin{bmatrix} \cos\beta & 0 & -\sin\beta & 0 \\ 0 & 1 & 0 & 0 \\ \sin\beta & 0 & \cos\beta & 0 \\ 0 & 0 & 0 & 1 \end{bmatrix} \quad \text{(Equation 11)}$$

-continued $$Rz(\gamma) = \begin{bmatrix} \cos\gamma & \sin\gamma & 0 & 0 \\ -\sin\gamma & \cos\gamma & 0 & 0 \\ 0 & 0 & 1 & 0 \\ 0 & 0 & 0 & 1 \end{bmatrix} \quad \text{(Equation 12)}$$

For convenience of description, a rotation matrix used to rotate the image using a pitch value will be referred to as a pitch rotation matrix, a rotation matrix used to rotate the image using a yaw value will be referred to as a yaw rotation matrix, and a rotation matrix used to rotate the image using a roll value will be referred to as a roll rotation matrix.

A conversion matrix may be generated by using Equation 9 to Equation 12.

That is, a movement matrix used to move the image may be generated by using the screen disparity value, a rotation matrix used to rotate the image may be generated by using at least one value including the roll value among the roll value, the pixel value, and the yaw value, and a conversion matrix used to convert the image may be generated by using the movement matrix and the rotation matrix.

Thus, an image of which a position is corrected by the conversion matrix can be provided.

For example, a conversion matrix of Equation 13 can be generated by using the movement matrix of Equation 9 and the roll rotation matrix of Equation 12.

$$F(z)=T(h)\times Rz(\gamma) \quad \text{(Equation 13)}$$

Further, a conversion matrix of Equation 14 can be generated by using the movement matrix of Equation 9 and the rotation matrixes of Equation 10 to Equation 12.

$$F(xyz)=T(h)\times Rx(\alpha)\times Ry(\beta)\times Rz(\gamma) \quad \text{(Equation 14)}$$

Specifically, four conversion matrixes that can convert the image can be generated.

Such a conversion matrix can be used to move the image in a diagonal direction by reflecting the head motion of the user so that the convergence adjustment is carried out, thereby enabling the user's gaze becomes a zero parallax state.

Accordingly, a position-corrected image of which accommodation is matched and convergence is adjusted is provided to the HMD such that a virtual stereoscopic image that can reduce the fatigue of the user's eyes and dizziness can be realized.

Figure 5:
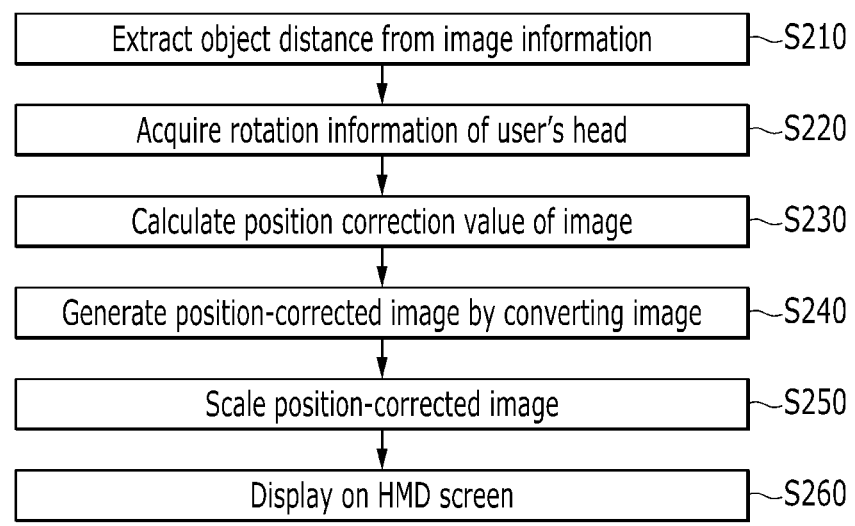
FIG. 5 shows a flowchart of a method for displaying a position-corrected image on the HMD according to an exemplary embodiment of the present invention.

FIG. 5 shows a sequence of a method for displaying a position-corrected image to an HMD according to an exemplary embodiment of the present invention.

Figure 6:
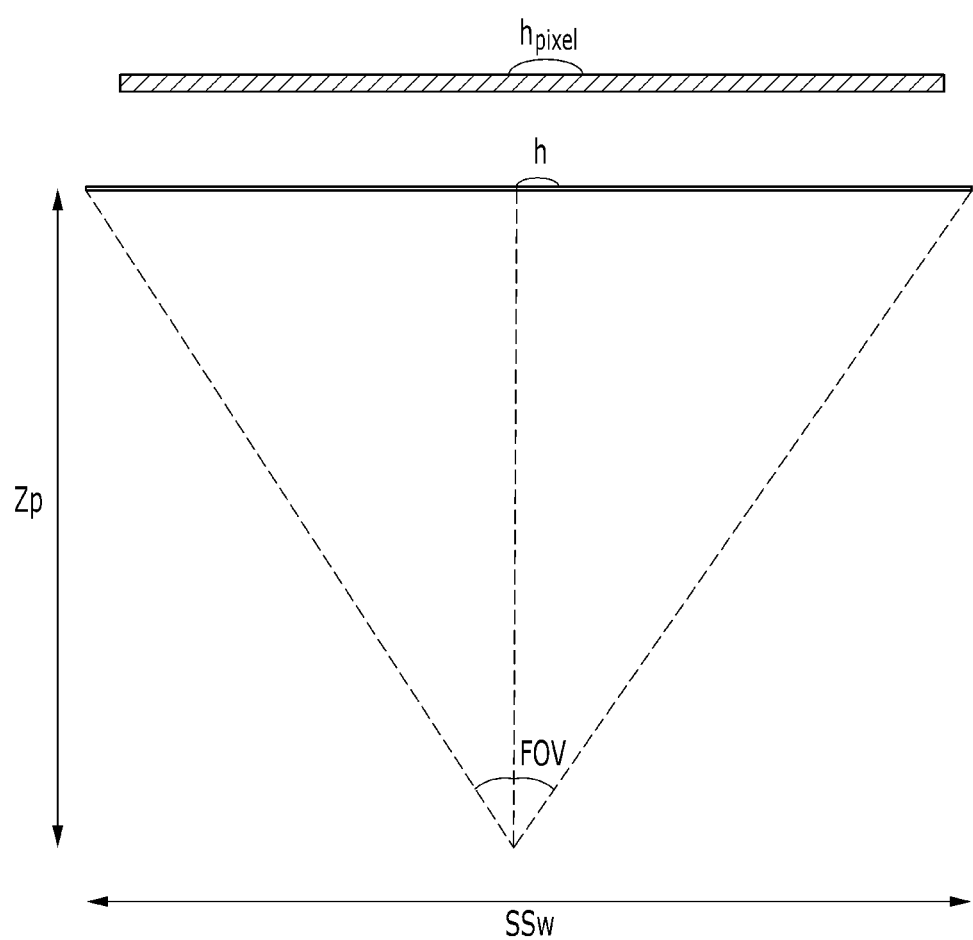
FIG. 6 is provided for description of image scaling according to another exemplary embodiment.

In addition, FIG. 6 is provided for description of exemplarily scaling of an image.

Figure 7:
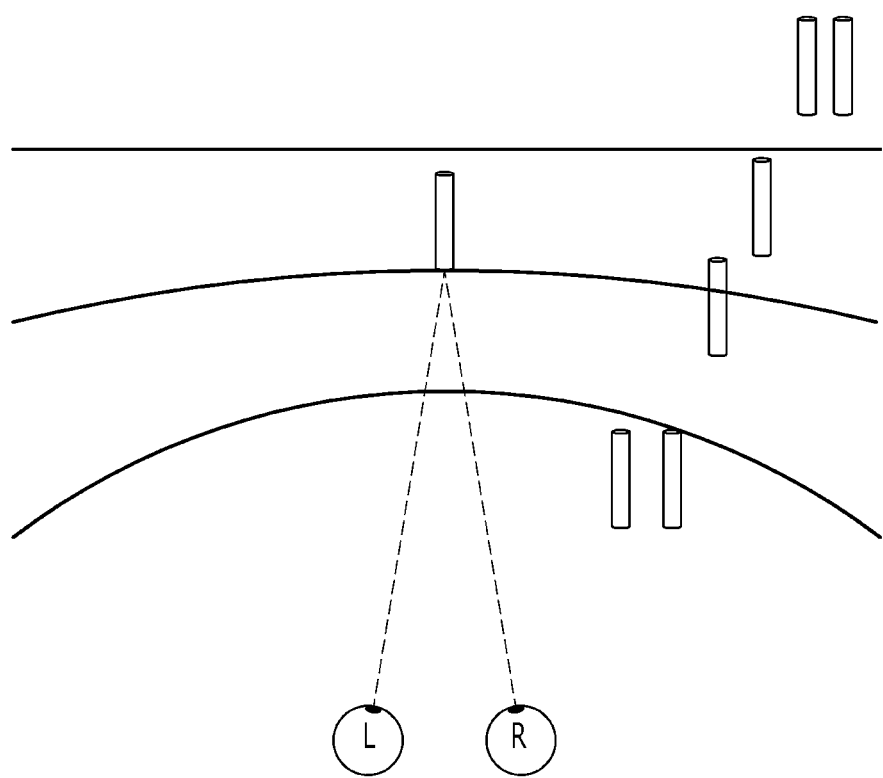
FIG. 7 is provided for description of Horopter and Panum's area with respect to the eyes of the HMD user.

Further, FIG. 7 is provided for description of horopter and panum's area with respect to the eyes of an HMD user.

Referring to FIG. 5, a method for displaying a position-corrected image to an HMD according to an exemplary embodiment of the present invention includes: extracting an object distance to a target object from image information (S210); acquiring rotation information according to head motion of the HMD user (S220); calculating a position correction value of the image by using the object distance and the rotation information (S230); generating a position-corrected image by converting the image according to the position correction value (S240); scaling the position-corrected image (S250); and displaying the scaled position-corrected image to a screen of the HMD (S260).

In this case, the steps S210 to S240 are the same as those of the method for providing the position-corrected image to the HMD according to the above-described exemplary embodiment of the present invention, and therefore no further detailed description will be provided.

Here, when a position-corrected image is generated by converting an image according to a position correction value (S240), a position of the image can be corrected by applying rotation information to movement information of the image.

Such a position-corrected image is provided to the HMD and then displayed on a screen of the HMD.

Specifically, as described above, a movement matrix used to move an image is generated by using a screen disparity value and a rotation matrix is used to rotate the image by using a pitch value and/or a yaw value together with a roll value, a conversion matrix used to convert the image by using the movement matrix and the rotation matrix is generated, and then a position-corrected image can be generated by applying the conversion matrix.

In this case, when the position-corrected image is scaled (S250), it can be scaled based on a viewing angle and a screen resolution of the HMD.

As shown in FIG. 6, size of an object in a virtual environment can be adjusted according to the screen where the object is actually displayed.

In FIG. 6, SSw denotes a size of a virtual screen in a virtual environment, FOV denotes a viewing angle of the HMD, Zp denotes a distance to the object, and h denotes a movement value of the object in the virtual environment.

In addition, SSv denotes a screen resolution and $h_{pixel}$ denotes a pixel shift value in an actual screen.

A relationship in the virtual environment is as given in Equation 15.

$$\tan(0.5 \cdot FOV)=(0.5 \cdot SSw)/Zp \quad \text{(Equation 15)}$$

The virtual environment may have the following proportional relationship with the actual screen as given in Equation 16.

$$SSw:SSv=h:h_{pixel} \quad \text{(Equation 16)}$$

Equation 17 can be derived from Equation 15 and Equation 16.

$$h_{pixel}=(h \cdot SSv)/\{2Zp \cdot \tan(0.5 \cdot FOV)\} \quad \text{(Equation 17)}$$

The image converted to adjust convergence can be scaled by applying Equation 17.

When the scaled position-correction image is displayed on the screen of the HMD (S260), a focus with respect to an area outside a pre-determined distance from the HMD may be set to be blurred.

As shown in FIG. 7, an area of a given range from the horopter that connects zero points matched when focus adjustments and convergence adjustment of the eyes are properly carried out is called a Panum's fusion area.

Outside of the Panum's fusion area, an object is not seen as one but as two.

Double vision occurring in a portion close to the left and right eyes L and R is called crossed disparity, and a portion away from the left and right eyes L and R is called uncrossed disparity.

When the focus adjustment is not properly carried out and thus the object is seen as two outside of the Panum's fusion area, the HDM user may feel dizziness.

Therefore, focuses with respect to objects that are outside the Panum's fusion area are set to be blurred so that fatigue of the eyes due to the mismatch can be reduced and the user's feeling of dizziness can be prevented.

Figure 8:
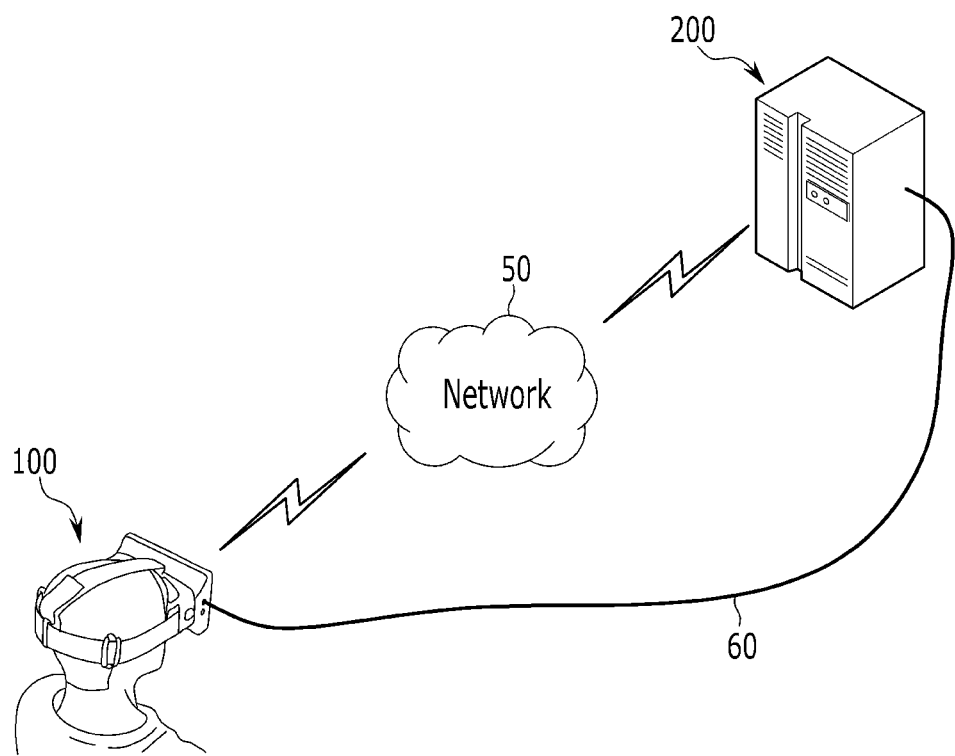
FIG. 8 schematically illustrates a system including an HMD that displays a position-corrected image according to an exemplary embodiment of the present invention.

FIG. 8 schematically shows a system that includes an HMD that displays a position-corrected image according to an exemplary embodiment of the present invention.

Figure 9:
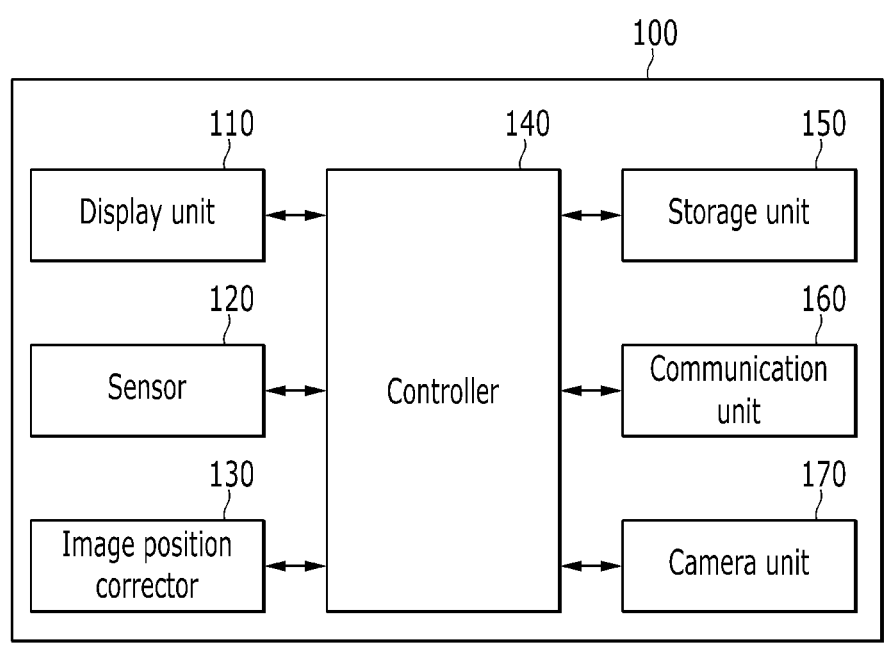
FIG. 9 shows a configuration of the HMD that displays the position-corrected image according to the exemplary embodiment of the present invention.

In addition, FIG. 9 shows a configuration of the HMD that displays a position-corrected image according to the exemplary embodiment of the present invention.

Referring to FIG. 8, a system that includes an HMD that displays a position-corrected image includes an HMD 100 that displays a position-corrected image and an external device 200 that communicates with the HMD 100 through a network 50.

In addition, the system may include an HMD 100 that displays a position-corrected image and an external device 200 that communicates with the HMD 100 through a cable 60.

The network 50 includes a wired network and a wireless network.

The wireless network enables long-distance wireless communication or short-distance wireless communication, and various wireless communication methods such as Bluetooth, ZigBee, near field communication (NFC), Wibree, and the like may be used.

The cable 60 is a physical communication line that directly connects the external device 200 and the HMD 100, and it is well known to a person skilled in the art that a known cable such as an HDMI cable can be used.

The external device 200 communicates with the HMD 100 that displays a position-corrected image through the network 50, and may transmit or receive an image to or from the HDM 100 through the network 50.

For example, an image is transmitted to the HDM 100 from the external device 200, and the HMD 100 corrects a position of the transmitted image and displays a position-corrected image and transmits the position-corrected image and information related thereto, data, and the like to the external device 200 to store them.

The position-corrected image, information, and data stored in the external device 200 are transmitted to another HMD 100 for assistance of convergence adjustment of a user of the other HMD 100.

Referring to FIG. 9, the HMD 100 that displays a position-corrected image may include a display unit 110, a sensor 120 that senses motion of a user and acquires rotation information according to head motion of the user, a position corrector 130 that converts an input image in real time based on the rotation information and provides the converted image, and a controller 140 that displays the position-corrected image provided from the image position corrector 130 to the display unit 110.

In addition, the HMD 100 that displays a position-corrected image may further include a storage unit 150 that stores an image, a communication unit 160 that externally receives an image, and a camera unit 170 that acquires an image.

The display unit 110 is provided as a pair that respectively correspond to the left and right eyes, and displays an image stored in the storage unit 150 or an image externally transmitted through the communication unit 160.

In particular, an object distance to a target object is extracted from the image information of the image, a position correction value of an image that is currently displayed is calculated by using the object distance and rotation information, and an image that is currently displayed is converted according to the position correction value and a position-corrected image is provided and displayed.

The sensor 120 senses the user's motion and acquires rotation information according to head motion of the user.

Such a sensor 120 may be provided with a three-axis acceleration sensor that can sense acceleration in three directions, a three-axis gyro sensor that can sense angular velocity in three directions, and a three-axis terrestrial magnetism sensor that can sense terrestrial magnetism in three directions.

In particular, the angular speed measured by the gyro sensor implies an angle variation amount per unit time, and since integration of angular velocity gives an angle, the gyro sensor calculates rotation of the head of the HMD user by integrating angular velocity data.

The image position corrector 130 extracts an object distance to a target object from image information of an input image, calculates a position correction value of the image by using the object distance and the rotation information, and converts the image according to the position correction value and then provides a position-corrected image.

Specifically, the image position corrector 130 calculates a screen disparity value formed by a screen of the HMT and the HMD user based on the object distance, and calculates the position correction value based on at least one including the roll value among the roll value, the pitch value, and the yaw value, as well as the screen disparity value.

For example, the image position corrector 130 may generate a movement matrix used to move the image by using the screen disparity value, generate a rotation matrix used to rotate the image by using at least one including the roll value among the roll value, the pitch value, and the yaw value, and generate a conversion matrix used to convert the image by using the movement matrix and the rotation matrix.

Thus, a position-corrected image of which a position is corrected by using the conversion matrix can be generated.

A detailed process for position correction of the image by using the conversion matrix has been described above, and therefore no further detailed description will be provided.

The image position corrector 130 may be provided as a separate module, or may be provided as a part of the controller 140.

In particular, the image position corrector 130 may be implemented as a program that can be executed in the HMD 100.

Since the image position corrector 130 is implemented as a program that can be executed in the HMD 100 rather than being provided as a physically separated constituent element, a conventional HMD can be modified not in hardware but in software so that convergence can be adjusted and a position-corrected image can be provided to the HMD.

The controller 140 controls the display unit 110, the sensor 120, the image position corrector 130, the storage unit 150, the communication unit 160, and the camera unit 170.

For example, the controller 140 displays a position-corrected image provided from the image-position corrector 130 on the display unit 110.

In addition, the controller 140 scales the position-corrected image and displays the scaled image on the display unit 110.

Specifically, the controller 140 may scale the position-corrected image based on a viewing angle of the HMD 100 and a screen resolution of the display unit 110.

This has been described above, and therefore no further detailed description will be provided.

The storage unit 150 may pre-store an image or may store an image transmitted from an external device 200, and may also store data or information related to the image.

In particular, the storage unit 150 may store various data and information in a database, and the data and the information may be double-stored in the storage unit 150 and the external device 200 to thereby increase stability of data.

The communication unit 160 receives various information such as an image and the like through the network 50.

An image transmitted through the communication unit 160 may be output in real time to the display unit 110 or may be stored in the storage unit 150.

The method for providing the position-corrected image to a personal HMD and the method for displaying a position-corrected image on the HMD according to the exemplary embodiment of the present invention can be implemented as one module by software and hardware, and the above-described embodiments of the present invention can be written in a program executable on a computer and can be implemented in a general-purpose computer that operates the program using a computer-readable recording medium.

The computer-readable recording medium is implemented in the form of a magnetic wave such as a ROM, a floppy disk, a hard disk, and the like, an optical medium such as a CD or a DVD, and a carrier wave such as transmission through the Internet In addition, the computer-readable recording medium may be distributed over a networked computer system so that computer readable code can be stored and executed in a distributed manner.

The components, units, blocks, or modules used in the present exemplary embodiment may be implemented by software components, such as tasks, classes, subroutines, processes, objects, execution threads, or programs, or by hardware components, such as an FPGA (Field Programmable Gate Array) or an ASIC (Application Specific Integrated Circuit), or by combinations of the software and hardware components.

The components may be included in a computer-readable storage medium, or some of the components may be distributed in a plurality of computers.

While this invention has been described in connection with what is presently considered to be practical example embodiments, it is to be understood that the invention is not limited to the disclosed embodiments, but, on the contrary, is intended to cover various modifications and equivalent arrangements included within the spirit and scope of the appended claims.

It is therefore to be understood that the above-described embodiments are illustrative in all aspects and not restrictive.

DESCRIPTION OF SYMBOLS

| | |
|---|---|
| 100: HMD (Head-Mounted Display) | |
| 110: display unit | 120: sensor |
| 130: image position corrector | 140: controller |
| 150: storage unit | 160: communication unit |

What is claimed is:

1. A method for providing a position-corrected image to a head-mounted display (HMD), comprising:
    extracting an object distance to a target object from image information;
    acquiring rotation information according to head motion of a HMD user;
    calculating a position correction value of an image by using the object distance and the rotation information, wherein the calculating the position correction value comprises:
        generating a movement matrix configured to be used to move the image based on a screen disparity value;
        generating a roll rotation matrix configured to be used to rotate the image based on a roll value; and
        performing matrix multiplication of the generated movement matrix with the generated roll rotation matrix to generate a conversion matrix configured to be used as the position correction value to convert the image; and
    converting the image according to the position correction value and providing the position-corrected image to the HMD.

2. The method for providing the position-corrected image to the HMD of claim 1, wherein the acquiring the rotation information comprises acquiring the roll value, which is rotation information with respect to a depth direction of a screen of the HMD with reference to the user.

3. The method for providing the position-corrected image to the HMD of claim 2, wherein the generating the movement matrix comprises calculating the screen disparity value formed by the screen of the HMD and the HMD user based on the object distance.

4. The method for providing the position-corrected image to the HMD of claim 1, wherein the acquiring the rotation information comprises acquiring the roll value which is rotation information with respect to a depth direction of the screen of the HMD with reference to the ground, a pitch value which is rotation information with respect to a horizontal direction of the screen of the HMD with reference to the ground, and a yaw value which is rotation information with respect to a vertical direction of the screen of the HMD.

5. The method for providing the position-corrected image to the HMD of claim 4,
    wherein the acquiring rotation information comprises acquiring a roll value, a pitch value, and a yaw value,
    wherein the generating the movement matrix comprises calculating the screen disparity value formed by the screen of the HMD and the HMD user based on the object distance,
    wherein the generating the roll rotation matrix comprises:
        generating a roll rotation matrix configured to be used to rotate the image based on the roll value;
        generating a pitch matrix configured to be used to move the image based on the pitch value;
        generating a yaw matrix configured to be used to rotate the image based on the yaw value, and
    wherein the performing matrix multiplication comprises performing matrix multiplication of the generated movement matrix with the generated roll rotation matrix, the generated pitch matrix, and the generated yaw matrix, to generate the conversion matrix configured to be used as the position correction value to convert the image.

6. A method for displaying a position-corrected image on a head-mounted display (HMD), comprising:
    extracting an object distance to a target object from image information;
    acquiring rotation information according to head motion of a user of the HMD;
    calculating a position correction value of an image by using the object distance and the rotation information,
    wherein the calculating the position correction value comprises:
        generating a movement matrix configured to be used to move the image based on a screen disparity value;
        generating a roll rotation matrix configured to be used to rotate the image based on a roll value, and
        performing matrix multiplication of the generated movement matrix with the generated roll rotation matrix to generate a conversion matrix configured to be used as the position correction value to convert the image;
generating a position-corrected image by converting the image according to the position correction value;
scaling the position-corrected image; and
displaying the scaled position-corrected image on a screen of the HMD.

7. The method for displaying the position-corrected image on the HMD of claim 6, wherein the scaling the position-corrected image comprises scaling the position-corrected image based on a viewing angle and a screen resolution of the HMD.

8. The method for display the position-corrected image on the HMD of claim 6, wherein the displaying the position-corrected image on the screen of the HMD comprises processing to blur a focus with respect to an area outside the HMD by a pre-determined distance.

9. A head-mounted display (HMD) displaying a position-corrected image, comprising:
 a display unit;
 a sensor that senses motion of a user and acquires rotation information according to head motion;
 an image position corrector that convers an input image in real time based on the rotation information and provides the converted input image; and
 a controller that displays a position-corrected image provided from the image position corrector on the display unit,
 wherein the image position corrector is configured to
  extract an object distance to a target object from image information of the input image,
  calculate a position correction value of the image based on the object distance and the rotation information, and
  convert the image based on the position correction value and provides the position-corrected image, and
 wherein the image position corrector is further configured to:
  generate a movement matrix configured to be used to move the image based on a screen disparity value;
  generate a roll rotation matrix configured to be used to rotate the image based on a roll value, and
  perform matrix multiplication of the generated movement matrix with the generated roll rotation matrix to generate a conversion matrix configured to be used as the position correction value to convert the image.

10. The HMD displaying the position-corrected image of claim 9, further comprising:
 a storage unit that stores an image; and
 a communication unit that communicates with an external device and receives an image from the external device.

11. The HMD displaying the position-corrected image of claim 9, wherein the sensor acquires the roll value which is information with respect to a depth direction of the screen of the HMD with reference to the ground, a pitch value which is information with respect to a horizontal direction of the screen of the HMD with reference to the ground, and a yaw value which is information with respect to a vertical direction of the screen of the HMD.

12. The HMD displaying the position-corrected image of claim 11, wherein the image position corrector is further configured to calculate the screen disparity value formed by the screen of the HMD and the HMD user based on the object distance.

13. The HMD displaying the position-corrected image of claim 9, wherein the controller scales the position-corrected image and displays the scaled image on the display unit.

14. The HMD displaying the position-corrected image of claim 13, wherein the controller scales the position-corrected image based on a viewing angle of the HMD and a screen resolution of the display unit.

* * * * *